(12) United States Patent
Ren et al.

(10) Patent No.: US 10,496,252 B2
(45) Date of Patent: Dec. 3, 2019

(54) INTERACTIVE MAP INFORMATIONAL LENS

(71) Applicant: Robert Bosch GmbH, Stuttgart (DE)

(72) Inventors: Liu Ren, Cupertino, CA (US); Zeng Dai, Mountain View, CA (US)

(73) Assignee: Robert Bosch GmbH, Stuttgart (DE)

(*) Notice: Subject to any disclaimer, the term of this patent is extended or adjusted under 35 U.S.C. 154(b) by 15 days.

(21) Appl. No.: 15/399,393

(22) Filed: Jan. 5, 2017

(65) Prior Publication Data

US 2017/0192637 A1    Jul. 6, 2017

Related U.S. Application Data

(60) Provisional application No. 62/275,346, filed on Jan. 6, 2016.

(51) Int. Cl.

| | |
|---|---|
| *G06F 3/0484* | (2013.01) |
| *G01C 21/36* | (2006.01) |
| *G06F 3/0481* | (2013.01) |
| *G06F 3/0482* | (2013.01) |
| *G06T 15/00* | (2011.01) |
| *G06T 19/00* | (2011.01) |
| *G06Q 30/02* | (2012.01) |
| *G09B 29/10* | (2006.01) |
| *G06Q 10/02* | (2012.01) |

(52) U.S. Cl.
CPC ......... *G06F 3/0484* (2013.01); *G01C 21/367* (2013.01); *G01C 21/3667* (2013.01); *G01C 21/3694* (2013.01); *G06F 3/0482* (2013.01); *G06F 3/04817* (2013.01); *G06Q 30/0269* (2013.01); *G06T 15/005* (2013.01); *G06T 19/003* (2013.01); *G09B 29/106* (2013.01); *G06Q 10/02* (2013.01); *G06Q 30/0241* (2013.01); *G06T 2200/24* (2013.01)

(58) Field of Classification Search
CPC ............................. G06T 19/006; H04W 4/046
See application file for complete search history.

(56) References Cited

U.S. PATENT DOCUMENTS

| | | | | |
|---|---|---|---|---|
| 6,388,684 B1* | 5/2002 | Iwamura | ............... | G09B 29/106 715/788 |
| 2004/0204848 A1* | 10/2004 | Matsuo | .................. | G01C 21/32 701/431 |
| 2006/0139375 A1* | 6/2006 | Rasmussen | ............ | G01C 21/32 345/641 |

(Continued)

*Primary Examiner* — Jeffrey J Chow
(74) *Attorney, Agent, or Firm* — Norton Rose Fulbright US LLP

(57) ABSTRACT

A system and method for providing a location based interactive informational display includes processing circuitry outputting on a display device a map of a region represented with a first level of detail and including a location focusing graphical indicia overlaid on a sub-region of the map, outputting on the display device a details frame that includes information of the sub-region with a second level of detail that is higher than the first level of detail, receiving user input for modifying the sub-region on which the location focusing graphical indicia is overlaid, and, responsive to the user input, modifying the display of the location focusing graphical indicia and modifying the details frame to include information at the second level of detail corresponding to the modified sub-region.

36 Claims, 9 Drawing Sheets

(56) References Cited

U.S. PATENT DOCUMENTS

| | | | |
|---|---|---|---|
| 2007/0155404 A1 | 7/2007 | Yamane et al. | |
| 2008/0051989 A1 | 2/2008 | Welsh | |
| 2008/0180282 A1* | 7/2008 | Brosius | G01C 21/00 340/995.27 |
| 2008/0284795 A1* | 11/2008 | Ebert | G01C 21/367 345/619 |
| 2010/0094531 A1 | 4/2010 | McLeod | |
| 2010/0161215 A1* | 6/2010 | Karani | G01C 21/3679 701/465 |
| 2011/0161872 A1 | 6/2011 | Abramson et al. | |
| 2011/0231767 A1* | 9/2011 | Russell | G06F 17/3087 715/733 |
| 2012/0316782 A1* | 12/2012 | Sartipi | G01C 21/367 701/455 |
| 2013/0332208 A1* | 12/2013 | Mehta | G06Q 10/02 705/5 |
| 2013/0332279 A1* | 12/2013 | Kuusela | G06Q 30/02 705/14.57 |
| 2014/0053077 A1 | 2/2014 | Unnikrishnan et al. | |
| 2014/0303806 A1* | 10/2014 | Bai | G01C 21/3697 701/1 |
| 2014/0336925 A1* | 11/2014 | Akin | G01C 21/00 701/457 |
| 2014/0347368 A1* | 11/2014 | Kishore | G06T 13/00 345/473 |
| 2015/0241235 A1* | 8/2015 | Lobato Fregoso | G01C 21/36 701/423 |
| 2016/0255268 A1* | 9/2016 | Kang | G06F 3/04845 348/333.11 |
| 2017/0108348 A1* | 4/2017 | Hansen | G01C 21/3682 |
| 2017/0124476 A1* | 5/2017 | Levinson | G05D 1/0088 |
| 2017/0206471 A1* | 7/2017 | Dermosessian | G06Q 10/02 |

\* cited by examiner

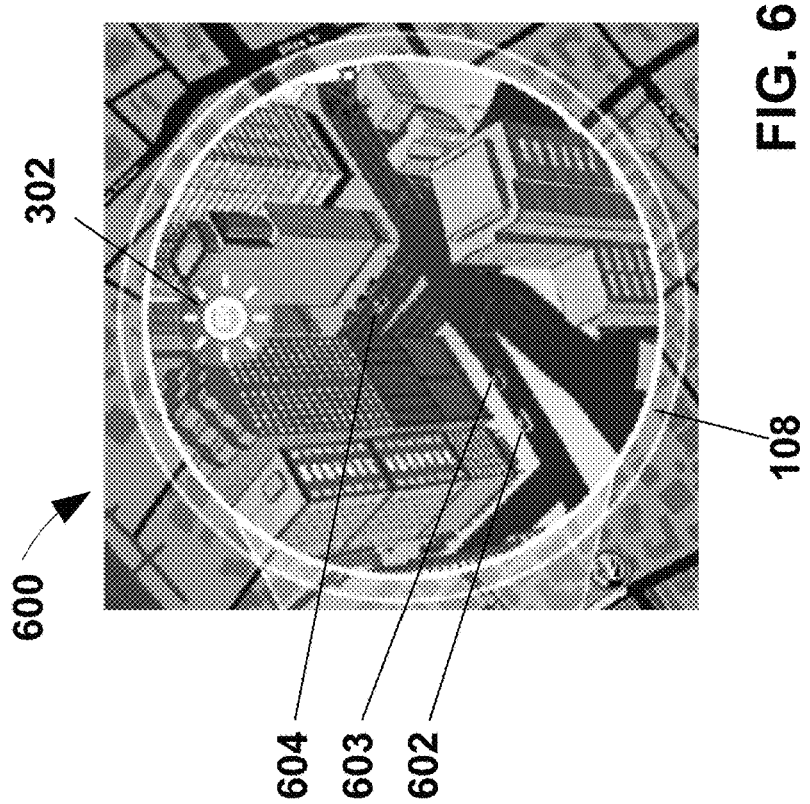
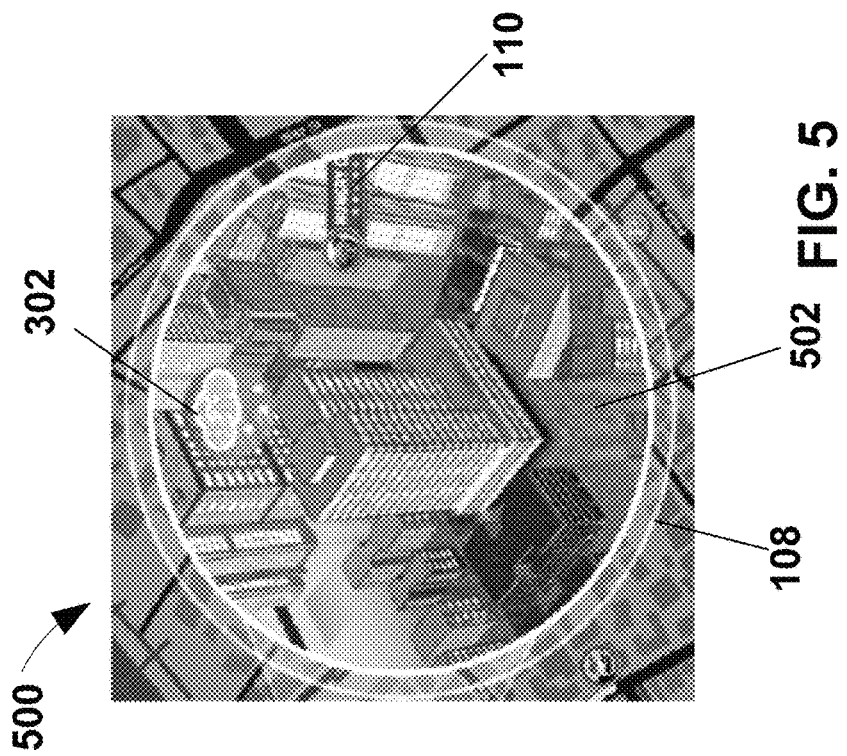

INTERACTIVE MAP INFORMATIONAL LENS

CROSS-REFERENCE TO RELATED APPLICATION

This application claims the benefit, under 35 U.S.C. § 119(e), of U.S. Provisional Patent Application Ser. No. 62/275,346, filed Jan. 6, 2016, the content of which is hereby incorporated by reference in its entirety.

FIELD OF THE INVENTION

The present invention relates to an interactive map that includes an information lens for providing visualization of complex location-based information.

BACKGROUND

Provision of maps in a digital environment is known. Such maps are often provided in navigation systems, such as those used as a driving aid in a vehicle. A user can interact with the navigation map display, for example, by touch of a touchscreen. Such interaction can be to shift the displayed portion of the map, for example, to move to a forward position of the map by dragging downward on the map display or to zoom in on a smaller region of the map or zoom out to a larger region of the map by, respectively, pinching two fingers towards each other on the map display or spreading two fingers away from each other on the map display. It is also known to display in the map a graphical indication of a current state of traffic at a displayed section of a navigation route by color coding sections of roads represented in the map display. For example, known systems provide a server to which a plurality of drivers log in. The sever tracks the logged-in users' driving, such as their speeds, and, based on the tracked information determines whether traffic on respective roads is moving slowly, at normal speed, or fast. Systems also provide users to actively input traffic information, such as current presence of a police officer, current traffic speed, and/or occurrence of an event, such as an accident, which information is uploaded to the server for update of respective displays of a plurality of users viewing a display of a region of a navigation map regarding which the information has been uploaded.

SUMMARY

Example embodiments of the present invention provide enhanced map informational visualization. Particularly, vehicle control is shifting into highly automated driving in which vehicle control is shifted away from the driver for more autonomous control by the vehicle itself, freeing the user to focus more attention on tasks other than driving, for example, other tasks that may be relevant to and/or enhance the driving experience. Thus, the present invention provides enhanced informational visualization in a map display and enhanced user interaction features for a map display.

According to an example embodiment of the present invention, a method for providing a location based interactive informational display includes: outputting, by processing circuitry and on a display device, an electronic map of a region represented with a first level of detail and including a location focusing graphical indicia, such as a graphical transparent lens or bubble, overlaid on a sub-region of the map; outputting, by the processing circuitry and on the display device, a details frame, for example in the form of an informational lens, that includes information of the sub-region with a second level of detail that is higher than the first level of detail; receiving, by the processing circuitry, user input for modifying the sub-region on which the location focusing graphical indicia is overlaid; and responsive to the user input, the processing circuitry modifying the display of the location focusing graphical indicia and modifying the details frame to include information at the second level of detail corresponding to the modified sub-region.

In an example, the method further includes obtaining, by the processing circuitry, a navigation route for a vehicle to a selected destination; displaying, by the processing circuitry and on the map, a graphical representation of at least a portion of the navigation route, where the different sub-region is along the navigation route; determining, by the processing circuitry, a time when the vehicle is estimated to reach the different sub-region; and, based on the determined time, obtaining, by the processing circuitry, information regarding at least one state forecasted to be existent at the sub-region at the estimated time, wherein the information of the sub-region included in the details frame includes a graphical indicia identifying the state forecasted to be existent at the sub-region at the estimated time.

In an example, the information of the sub-region included in the details frame includes a three-dimensional representation of a building with a graphical indicia identifying presence of a particular venue in the building. In an example, the graphical indicia includes a representation of a window with a representation, in the window, of items sold at the particular venue. In an example, the window representation indicates an open/closed state of the venue. In an example, a portion of the details frame is selectable for enabling user interaction with the venue, such as by enabling online purchasing.

According to an example embodiment of the present invention, a system for providing a location based interactive informational display includes a user input and output device that includes a display and processing circuitry, where the processing circuitry is configured to: output on the display device a map of a region represented with a first level of detail and including a location focusing graphical indicia overlaid on a sub-region of the map; output on the display device a details frame that includes information of the sub-region with a second level of detail that is higher than the first level of detail; receive, via the user input and output device, user input for modifying the sub-region on which the location focusing graphical indicia is overlaid; and responsive to the user input, modify the display of the location focusing graphical indicia and modify the details frame to include information at the second level of detail corresponding to the modified sub-region.

According to an example embodiment of the present invention, instructions are stored on a non-transitory computer-readable medium, the instructions being executable by a processor and, when executed by the processor, causing the processor to perform a method for providing a location based interactive informational display, where the method includes: outputting on a display device a map of a region represented with a first level of detail and including a location focusing graphical indicia overlaid on a sub-region of the map; outputting on the display device a details frame that includes information of the sub-region with a second level of detail that is higher than the first level of detail; receiving user input for modifying the sub-region on which the location focusing graphical indicia is overlaid; and responsive to the user input, modifying the display of the location focusing graphical indicia and modifying the details frame to include information at the second level of detail corresponding to the modified sub-region.

These and other features, aspects, and advantages of the present invention are described in the following detailed description in connection with certain exemplary embodiments and in view of the accompanying drawings, throughout which like characters represent like features. However, the detailed description and the appended drawings describe and illustrate only particular example embodiments of the invention and are therefore not to be considered limiting of its scope, for the invention may encompass other equally effective embodiments.

BRIEF DESCRIPTION OF THE DRAWINGS

FIG. 5 is a screenshot illustrating use of a reflection effect to represent rainy weather in an informational lens according to an example embodiment of the present invention.

FIG. 6 is a screenshot of the informational lens including traffic icons according to an example embodiment of the present invention.

DETAILED DESCRIPTION

Figure 1:
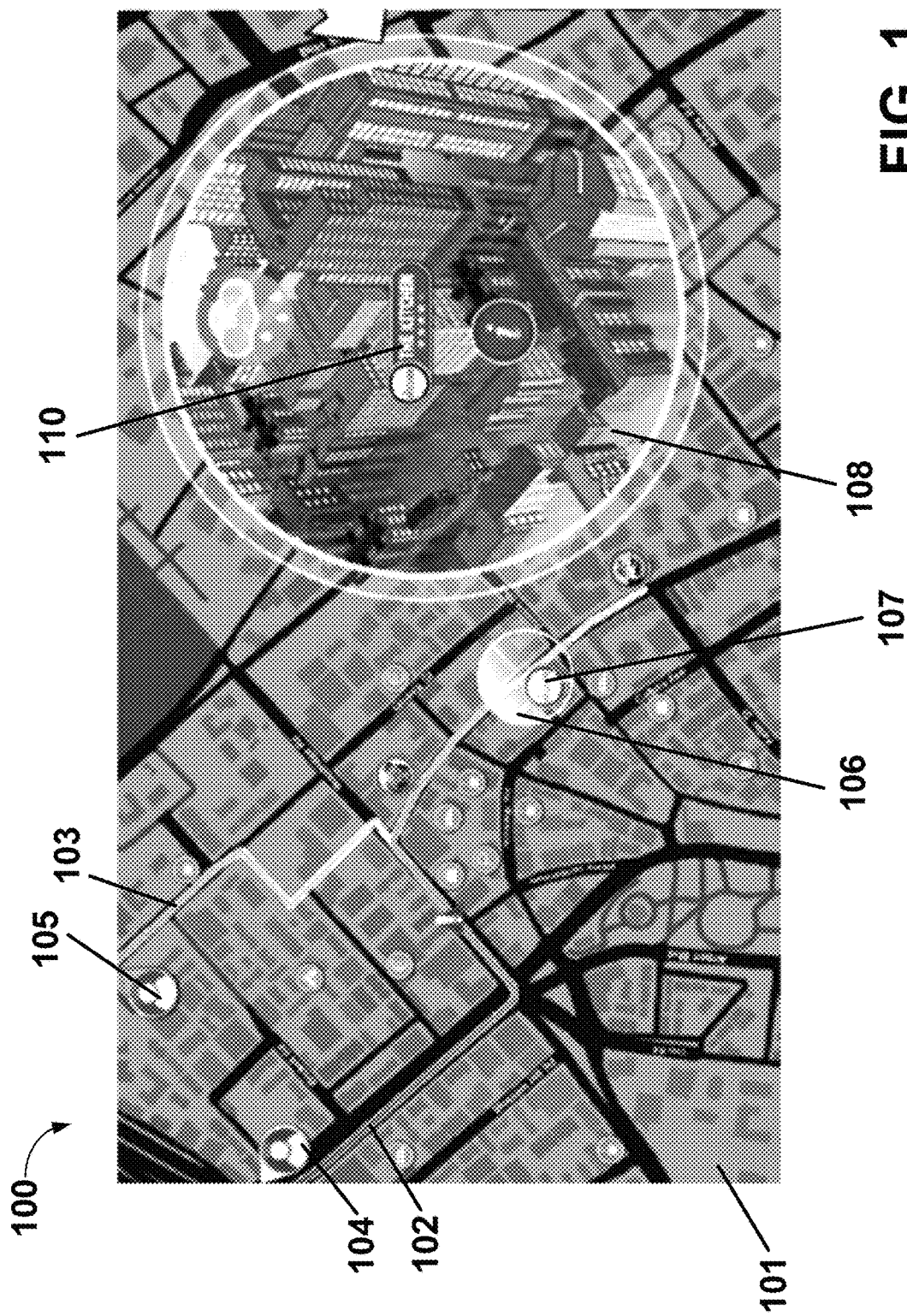
FIG. 1 is a screenshot illustrating an electronic map display according to an example embodiment of the present invention.

According to an example embodiment, a system provides a map display where a user can interact with the map to cause a processor of the system to change the region of the map being displayed. The processor also responds to user input, such as by touching a location on the map, which is interpreted by the processor as a selection of the location of the displayed region of the map, by displaying, e.g., overlaid on the map display, a details frame or window, e.g., in the form of an informational lens, that provides additional details concerning the pointed to location of the map.

In an example embodiment, the additional information provided in the informational lens includes a highly detailed three dimensional representation of the pointed to location of the map, for example similar to as described in PCT/US2015/067461 filed on Dec. 22, 2015, which claims priority to U.S. Provisional Patent Application Ser. No. 62/095,372 filed on Dec. 22, 2014, the content of each of which is hereby incorporated by reference in their entireties.

According to an example embodiment, the additional information includes a weather status at the pointed to location.

According to an example embodiment, the additional information includes a lighting status at the pointed to location.

According to an example embodiment, the additional information includes a representation of a pedestrian density at the pointed to location. For example, according to an example embodiment, vehicles include sensors that detect presence of pedestrians and upload such information to a server. The server then updates the map displays in devices, such as vehicles, including, for example, those vehicles from which the pedestrian information was obtained and/or other vehicles, to include a representation of the pedestrian presence status. (It is noted that in an example embodiment a vehicle processor can generate such displays based on information sensed by the vehicle itself without requiring such information from the server.) According to an example embodiment, the server logs pedestrian information over time and generates time profiles of average pedestrian presence at respective locations at various times of day and/or various particular days of the week and/or dates of the year, and generates the pedestrian presence representation based on the profiles.

In an example embodiment, the system displays a representation of the pedestrians in an abstract form, e.g., as a silhouette or ghost form. In an example, the system displays the abstract pedestrian forms differently depending on a weather state, for example, with an umbrella if raining, with shorts if hot, with overcoats if cold, with boots if snowing, etc.

According to an example embodiment, the additional information includes information relevant to categories of interest tailored to a specific user. For example, in an example embodiment, the system includes a processor that is configured to receive user input of a particular interest, such as that a user is hungry or is looking for a restaurant, in accordance with which input the system presents map information identifying presence of a restaurant in a map region with which the informational lens is currently associated, if a restaurant is indeed located at that map location. According to an example, the user can select multiple categories of interest, in accordance with which the system displays information relevant to each of the selected categories. For example, if the user indicates a present interest in restaurants and clothing shopping, the system includes the informational item indicating presence of any restaurant or clothing shop in the map region with which the informational lens is associated. The output can also be fine-tuned to sub-categories, e.g., French cuisine for which French restaurants are output. According to an example embodiment, the system is configured to use social networking to identify points of interest to particular users. For example, a number of users may be linked to each other as friends, for example, at the server. Alternatively, users can link their social networking accounts to the mapping service, and the server may obtain the friend associations from the linked social networking accounts. In an example, the system displays in the informational lens information concerning locations identified by a user's linked friends as being of interest, and/or concerning locations at which the user's friends are currently located or have recently visited.

According to an example embodiment, the additional information includes a graphical representation of an open/closed status of a particular store or restaurant located in the location with which the informational lens is associated. In an example embodiment, the additional information includes a graphical animation for drawing the user's attention to a particular point of interest. For example, if a particular store or restaurant, which is open, is identified by the system as being of particular interest to the user, in an example embodiment, when the user shifts the focused map region with which the informational lens is associated to the region that includes the store or restaurant identified as being or interest, the system displays an animation of a window dressing, e.g., a curtain, opening under a sign identifying the particular store or restaurant. In an example, other stores, not identified as being of particular interest, are graphically represented with an open curtain, but without such an animation. Alternatively, they are represented with a closed curtain. Alternatively, they are not represented. In an example, other stores not identified as being of particular interest to the particular user are displayed in a greyed out form. (As another example, the windows can be presented in a darkened or lighted form, depending on the open/closed status and/or depending on the user's interests, and similarly be displayed with an animation changing the window state from darkened to lighted.)

In an example embodiment, the system displays a traffic status by displaying three dimensional graphical representations of vehicles, e.g., of cars. For example, if traffic is dense, many such graphical representations are displayed per predefined unit of road length, but if traffic is sparse, then fewer such graphical representations are displayed per predefined unit of road length.

In an example embodiment, the graphical representation of the vehicles is displayed with an animation of the vehicle representations moving along a displayed representation of a road. In an example, the animations are provided such that the speed at which the vehicle representations move corresponds to, and therefore indicates, a traffic status, where the speed is higher if the traffic is moving well and slower if not moving well. In an example, the speed at which the graphical vehicle representations move is proportionate to the average speed at which the vehicles the represented road segment are moving, e.g., a certain number of pixels per second per mile per hour that the average vehicle on the depicted segment is traveling. Alternatively, the speed of the graphical vehicle representation is relative to the posted speed limit of the relevant road segment. For example, if the average vehicle on the relevant road segment is moving approximately at the posted speed limit, then the graphical vehicle representations move at one speed, if the average vehicle on the relevant road segment is moving a certain predefined amount or percentage below the posted speed limit, then the graphical vehicle representations moves at a second slower speed, and if the average vehicle on the relevant road segment is moving a certain high predefined amount or percentage below the posted speed limit, then the graphical vehicle representations moves at a third even slower speed.

In an example embodiment, the graphical representation of the vehicles is displayed in a color coded fashion, e.g., where the vehicle representations are in a first color, e.g., green, if traffic is moving well, in a second color, e.g., yellow, if traffic is moving less than optimally, and in a third color, e.g., red, if traffic is moving very poorly. In other examples, other color gradations can be used to more finely represent how well traffic is moving.

It is noted that combinations of these features of graphical vehicle representations can be provided in an example embodiment. For example, in an example, the system displays three dimensional vehicle representations, with a density that corresponds to traffic density status, that move at a pace that corresponds to how well traffic is moving at the relevant road section, and with colors that correspond to how well traffic is moving at the relevant road section.

In an example embodiment, the granularity of the information, including the above-noted information and the three-dimensional topographical information provided in the informational lens depends on a size of a map region selected by the user, where the system is configured for user input selecting a size of the selected map region. For example, in an example embodiment, the system is configured for user input via touchscreen and is configured to interpret a pinching in of two fingers within or at a bubble displayed over a map region as an instruction to decrease the size of the bubble so that it covers a smaller region within the displayed map; and the system is configured to interpret a spreading out of two fingers within or at the bubble displayed over the map region as an instruction to increase the size of the bubble so that it covers a larger region within the displayed map. The system is configured to display details in the informational lens corresponding to the region covered by the bubble. Accordingly, with the changing of the size of the bubble, the system is configured to change the information displayed in the informational lens.

In an example embodiment, the system is configured to respond to a predefined user input, e.g., a predefined user interaction with the display screen on which the map is displayed, to shift the location of the bubble from one location on the map to another location on the map. For example, in an example embodiment, the user can press on the displayed bubble and drag it to a new location on the displayed map. In an example embodiment, the user can drag the bubble to an edge of the displayed map and continue the dragging motion, in response to which the system shifts the map region that is displayed, besides for shifting the location of the bubble relative to the displayed map region. In response to the shifting the bubble relative to the map, the system updates the informational lens to include the additional details concerning the new map region covered by the bubble.

In an example embodiment, the system is configured for user interaction with the informational lens as well, and to responsively update the size and/or position of the bubble displayed on the map. For example, in an example embodiment, a user can use pinching in or spreading out motions within the informational lens to zoom in on or zoom out of a particular region in the informational lens, and the system accordingly minimizes or enlarges the size of the bubble. Similarly, in an example embodiment, a user can drag the displayed topographical graphical representation within the informational lens to move the representation to be of a different map region, and the system accordingly shifts the bubble to a different location of the displayed map. According to an alternative example embodiment, interaction with the informational lens to change a location or coverage area within the informational lens does not effect a change in the display of the bubble in the map. According to yet another alternative example embodiment, a location or coverage area within the informational lens cannot be performed by interaction with the informational lens, but rather only by interaction with the bubble in the map.

In an example embodiment, instead of displaying status information, such as weather, traffic, pedestrian presence, lighting, and/or open/closed status of venues, etc., according to a current status, the system displays the status for a future time. For example, in an example embodiment, a user inputs a destination and the system displays the map in a vehicle display with a graphical representation of a navigation route for leading the vehicle from a current position to the input destination. The user can interact with the map display to change the displayed region of the map, for example, to a different region along the calculated route. Additionally, the user can shift the bubble to a different location along the calculated route represented in the displayed map (the calculated route being represented, for example, by a particular highlighting indicating that a displayed route segment is part of the calculated route). The system is configured to calculate an estimated time by which the vehicle is expected to reach the route segment over which the bubble is positioned, for example, using any conventional navigational system time estimation, assuming continued traveling of the vehicle along the calculated route. The system is configured to display one or more of the noted status information to represent the status for the respective category of information which expected to be existent at the time at which the system has calculated the estimated time the vehicle is expected to reach the route segment over which the bubble is positioned.

For example, in an example embodiment, a processor receives, via a communication interface, a weather forecast feed on the basis of which the processor determines a weather expected at the time at which the vehicle is estimated to reach the location. As another example, the processor receives, via the communication interface, a feed regarding sunrise and sunset times (or has such information pre-stored locally), on the basis of which the processor determines a lighting status, such as daylight or dark of night, expected at the time at which the vehicle is estimated to reach the location. A combination of the weather feed and the sunrise/sunset times can be used to determine lighting, e.g., semi-dark for overcast daylight. The system displays the detailed view of the region in the informational lens with blue, black, or grey sky accordingly, and/or displays the three dimensional representation of topographical structures such as buildings with coloring selected based on the lighting pattern selected based on the feed.

As another example, the system receives information from advertisers or proprietors regarding store hours (or has such information pre-stored locally) and displays a graphical representation of a store and/or restaurant to indicate its status as open or closed depending on whether the store hour information indicates that the respective venue will be open at the time at which the vehicle is estimated to reach the location of the venue.

As another example, past patterns of pedestrian presence and/or traffic density and/or movement are used by the processor to determine expected pedestrian presence and/or traffic density and/or movement at the time at which the vehicle is estimated to reach the location corresponding to the map region over which the bubble has been placed. For example, the system can identify light traffic at a particular location at late hours or on a federal holiday or on a weekend if traffic has repeatedly lightened in the past at such times/dates/days.

It is noted that, although the discussion herein refers to a bubble positioned over a region of the displayed map and which is associated with the informational lens, in alternative example embodiments, other graphical indicia can be used instead of the bubble.

FIG. 1 is a screenshot 100 of an electronic map display 101, according to an example embodiment of the present invention. In an example embodiment, a processor generates the electronic map display 101 and displays it on a display device, for example, that is part of a vehicle or that is present inside a vehicle. In the illustrated example, the electronic map display includes a graphical representation of a first navigation route 102 and a second travel route 103, each associated with a respective user, and further includes a first user icon 104 representing the first user associated with the first navigation route 102 and a second user icon 105 representing the second user associated with the second navigation route 103. For example, one of the user icons 104/105 can be associated with a user interacting with the electronic map display 101, and the other of the user icons 104/105 can be associated with a user linked, e.g., by a social networking site to the user interacting with the electronic map display 101. However, in an example embodiment, it is not required for the electronic map display to include a representation of a navigation route associated with the user interacting with the electronic map display 101, even if navigation routes 102 and 103 are displayed for other users linked to the user for whom the electronic map display is generated and who interacts with the electronic map display 101. Although FIG. 1 only shows two navigation routes 102 and 103 and associated user icons 104 and 105, any number of navigations routs and corresponding user icons can be displayed.

In an example embodiment, the processor displays each displayed navigation route and corresponding user icon with a respective color in order to aid a user to keep track of the different displayed navigation routes. For example, in an example, navigation route 102 is displayed in blue and navigation route 103 is displayed in green. In an example embodiment, where two or more of the navigation routes 102 and 103 overlap, one of the routes is selected as primary and its color is used for the overlapping section. For example, in an example embodiment, if one of the navigation routes 102/103 is a route calculated for the user for whom the display is generated, that navigation route is selected as primary.

In an example embodiment, as shown in FIG. 1, the system displays on the electronic map display 101 a focusing bubble 106 or other focusing graphical indicia that outlines or points to a particular focused sub-region of the electronic map display 101. The system further displays an informational lens 108 that includes additional details regarding the sub-region at the location of the bubble 106. For example, in an example embodiment, the electronic map display 101 displays a two-dimensional map of a large region, and the informational lens 108 displays a three-dimensional representation of a topography at the sub-region at which the bubble 106 is positioned in the two-dimensional map, as shown in FIG. 1.

In an example embodiment, the system is configured to display in the informational lens 108 graphical indicia for identifying a point of interest, such as a store or restaurant. For example, FIG. 1 shown display of a representation 110 of a restaurant at a particular building shown in the informational lens 108.

Although the informational lens is shown to be displayed as an overlay on top of a portion of the two-dimensional map, in an alternative example embodiment (not illustrated), the system is configured to display the informational lens in a separate region of the display screen.

Figure 2:
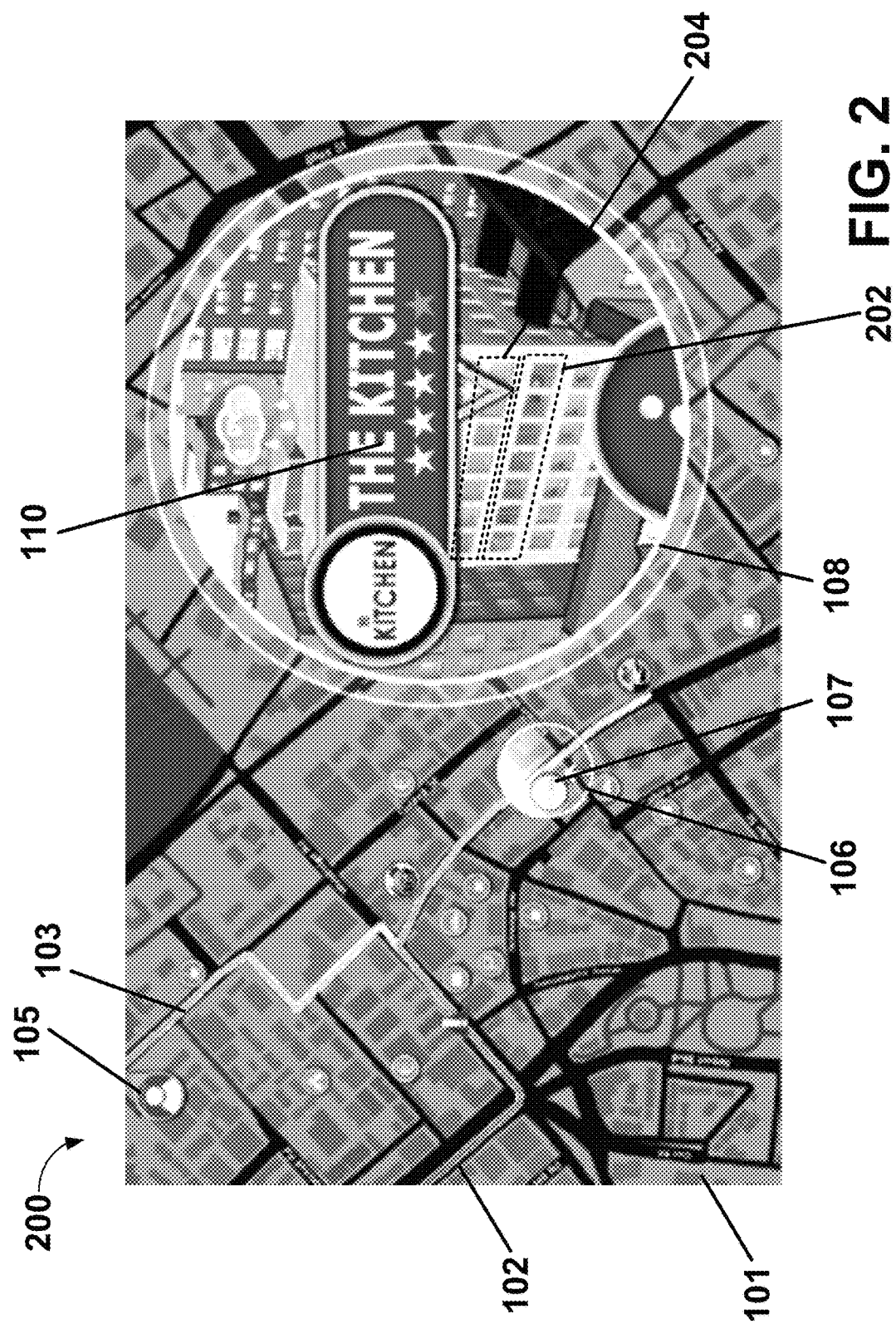
FIG. 2 is a screenshot illustrating an electronic map display with a window block representation according to an example embodiment of the present invention.

FIG. 2 shows another screenshot 200 of the electronic map display 101, according to an example embodiment of the present invention. For example, in an example embodiment, a user can zoom in on a portion of the three-dimensional representation in the informational lens 108, in which zoomed-in state, the system provides even more three-dimensional information. For example, as shown in FIG. 2, when zoomed in, the system, in an example embodiment, displays a graphical indicia showing that a store or restaurant of interest is located above the first floor of a building. In an example embodiment, the indicia includes the representation 110 pointing to a window block 202 positioned at an upper floor of a depicted building. In an example embodiment, the window block is shown to include a plurality of open windows, as illustrated in FIG. 2, which, according to an example embodiment indicates that the represented store or restaurant is open (or will be open at a time the user's vehicle is estimated to arrive at the location of the store or restaurant). In an example embodiment, other windows are represented with a window block 204, illustrated in a closed state, for example in response to a determination that the window block 204 corresponds to a venue that is closed or corresponds to a venue whose open/closed status is unknown, or corresponds to an unknown venue, or corresponds to a venue that is not identified as a point of interest for the user. In an example embodiment, where the represented store or restaurant (or other item) is identified as a point of interest for the user, the system displays the window block 202 with an animation of a window treatment opening up in order to draw the user's attention to the point of interest.

The combination of the views provided with the informational lens 108 and the overall display of the map 101 simultaneously provides detailed information and a positional context for the detailed information.

Figure 3:
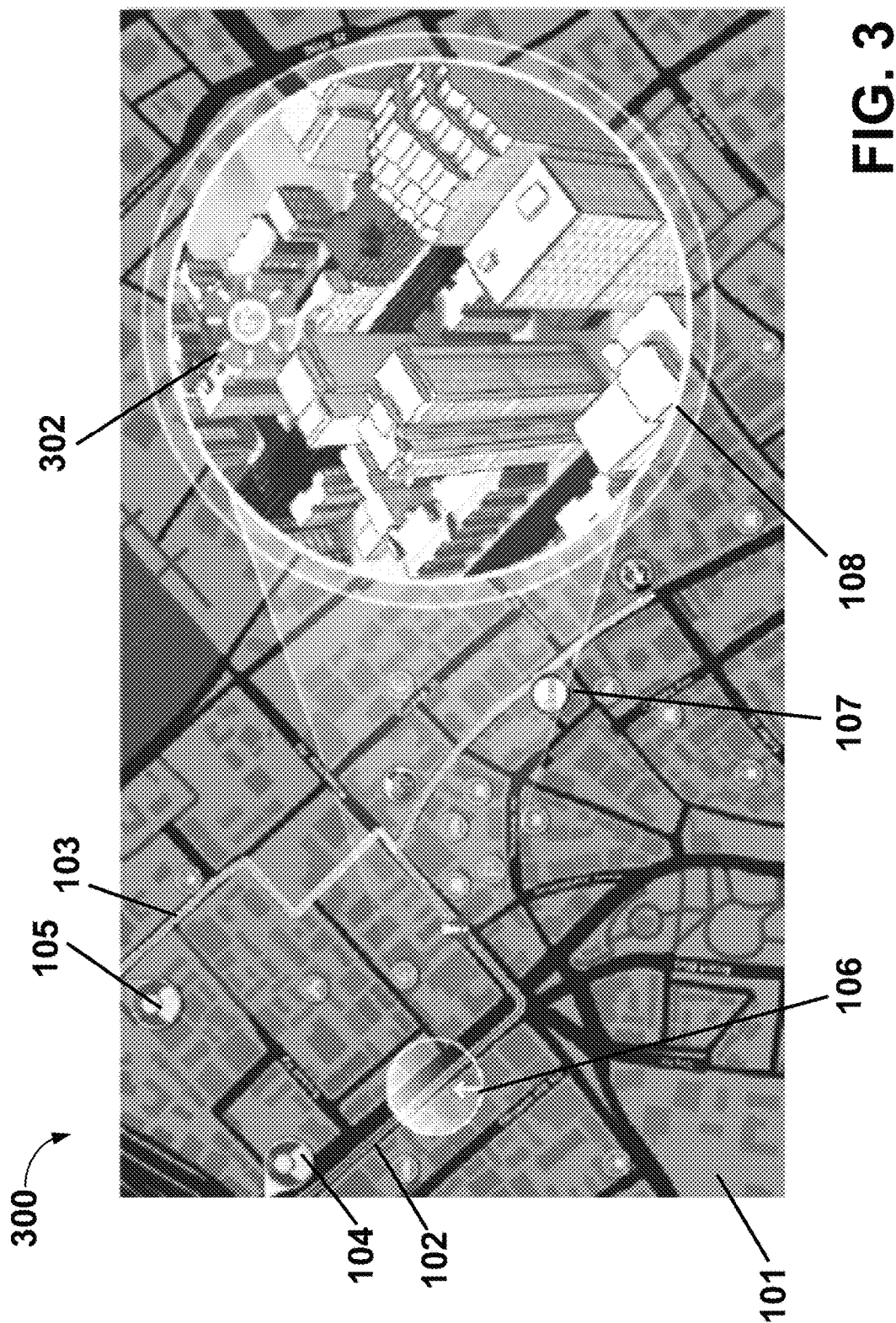
FIG. 3 is a screenshot illustrating an electronic map display including a weather icon with a first weather indication according to an example embodiment of the present invention.

FIG. 3 shows another screenshot 300 of the electronic map display 101, according to an example embodiment of the present invention, in which the informational lens 108 includes a weather icon 302 that indicates a weather status at the location that is covered by the bubble 106. In FIG. 3 the weather icon 302 is in the form of a sun, indicating sunny weather.

Figure 4:
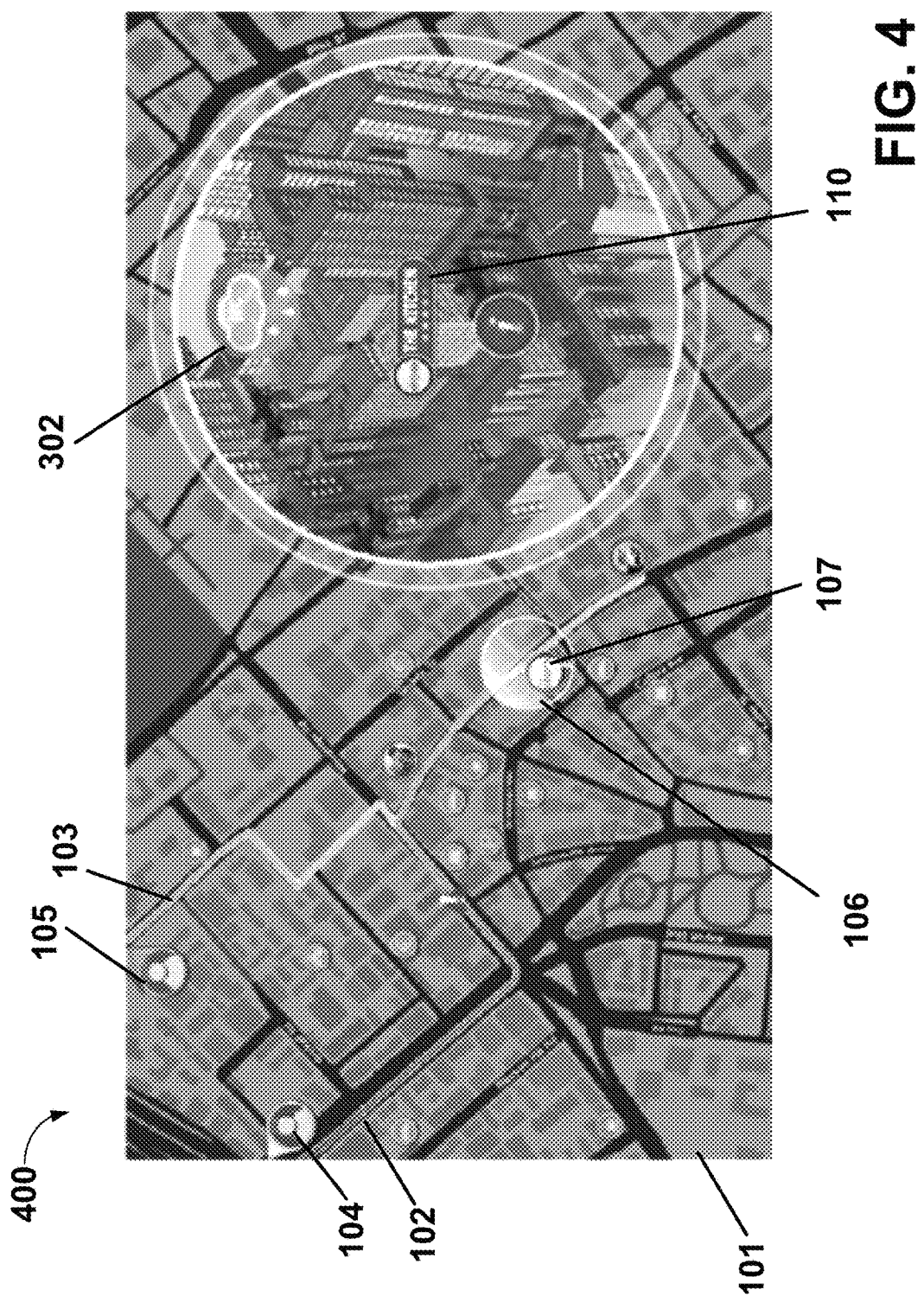
FIG. 4 is a screenshot illustrating an electronic map display including a weather icon with a second weather indication according to an example embodiment of the present invention.

FIG. 4 shows another screenshot 400 of the electronic map display 101, according to an example embodiment of the present invention, in which the weather icon 302 is in the form of a cloud with drops of rain, indicating rainy weather.

In screenshots 100-400, the two dimensional map shown in the electronic display map 101 outside of the informational lens 108 also includes two-dimensional icons corresponding to particular venues. For example, the screenshots 100-400 include a two dimensional icon 107 corresponding to the restaurant represent by restaurant representation 110. In an example embodiment, the two dimensional icons corresponding to particular venues are displayed with a vibrant color if the venue is identified as being presently of interest for the current user and is otherwise not provided, or, alternatively, is provided but as a grayed out point of interest (POI).

FIG. 5 shows another screenshot 500 of a portion of the electronic map display 101, according to an example embodiment of the present invention, in which a rainy weather status is indicated by both the weather icon 302 and an illustration of a ground reflection 502, which is not illustrated when the indicated weather status is not a rainy weather status.

FIG. 6 shows another screenshot 600 of a portion of the electronic map display 101 including the informational lens 108 in which traffic icons 602-604 are displayed to indicate a traffic status, according to an example embodiment of the present invention. For example, as shown, in an example embodiment, the traffic icons 602-604 are three dimensional abstract graphical representations of generic vehicles, illustrated as traveling on a road segment depicted in the informational lens 108. In an example embodiment, the traffic icons 602-604 are depicted with varying colors depending on different categorized traffic movement at various locations of the depicted road segment. For example, traffic icons 602 and 604 can be shown in yellow, while traffic icon 603 is simultaneously shown in green, indicating that traffic is moving well at the portion of the road segment at which traffic icon 603 is shown but is moving sub-optimally at the portions of the road segment at which traffic icons 602 and 604 are shown. In an example embodiment, the traffic icons 602-604 are shown with an animation of movement along the road segment. In an example embodiment, the system varies the speed of the movement of the respective traffic icons depending on the traffic movement on the road segment on whose representation the respective traffic icons are displayed. In an example embodiment, the number of traffic icons displayed at particular parts of a road segment depend on traffic density status at the respective parts of the road segment. In an example embodiment, where the traffic density is unknown, a predefined standard number of traffic icons are used. In an example embodiment, the traffic state information is based on car2x communication.

Figure 7:
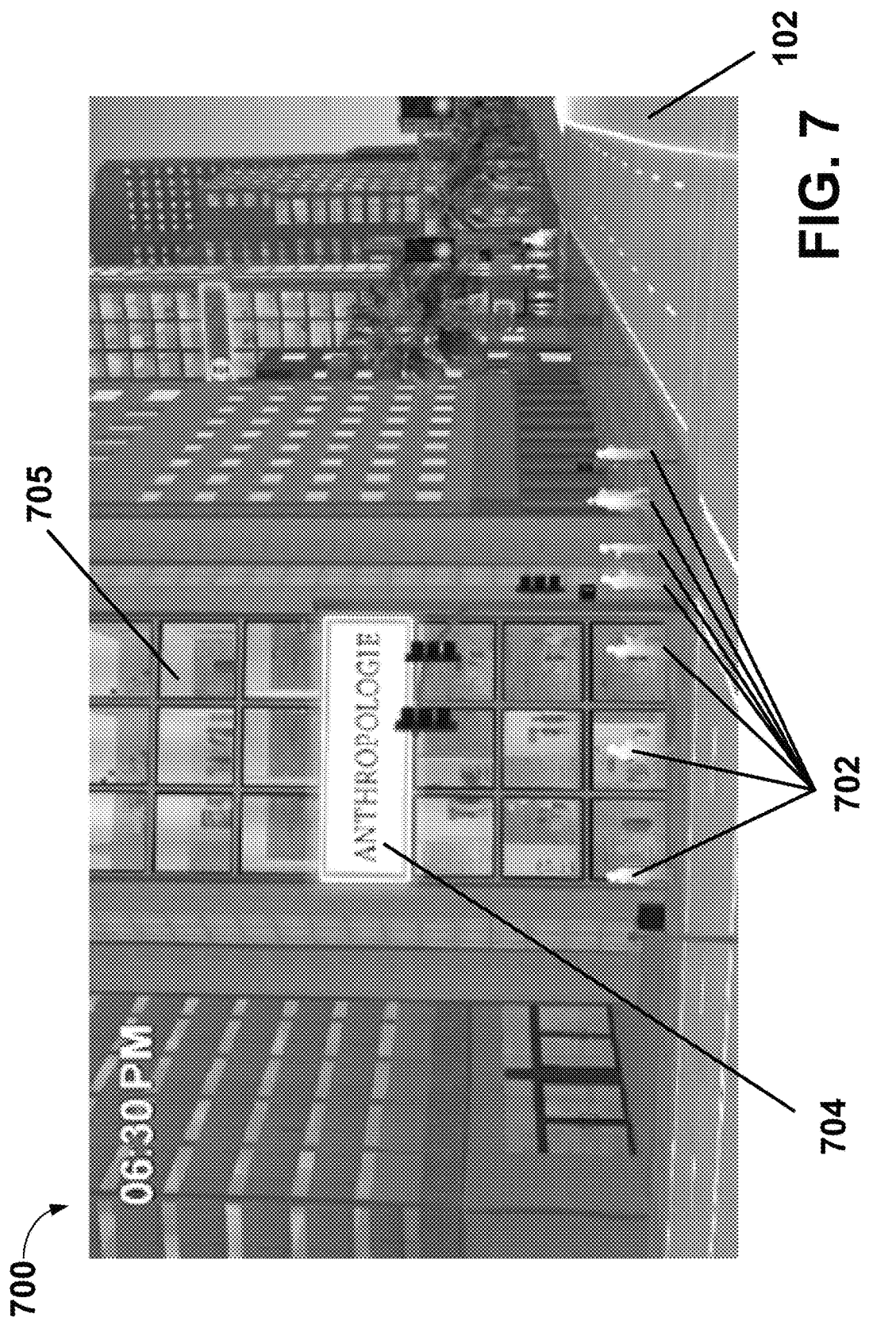
FIG. 7 is a screenshot illustrating a street map view including pedestrian icons according to an example embodiment of the present invention.

FIG. 7 shows a screenshot 700 of a street map view according to an example embodiment of the present invention, which the system is configured to display. The following describes some features illustrated in the street map view. However, the description of the features illustrated in the street map view are, according to an example embodiment of the present invention, also provided in the informational lens 108 where relevant to the area illustrated in the informational lens 108. According to an example embodiment of the present invention, the street map view provides a display according to the perspective of the viewing frustum of a traveler on a road segment, whereas the informational lens 108 provides a display according to a perspective of a bird's eye view, e.g., at a 40-45° downward angle. Alternatively, in an example embodiment, a user can select settings of the informational lens 108 to set the perspective, e.g., as either a bird's eye view or as a street map view.

In an example embodiment, as shown in FIG. 7, the system is configured to display pedestrian icons 702 to represent presence of pedestrians at a depicted route segment. In an example embodiment, the number of included pedestrian icons 702 that are displayed depends on a detected or estimated pedestrian density at the subject location.

Figure 8:
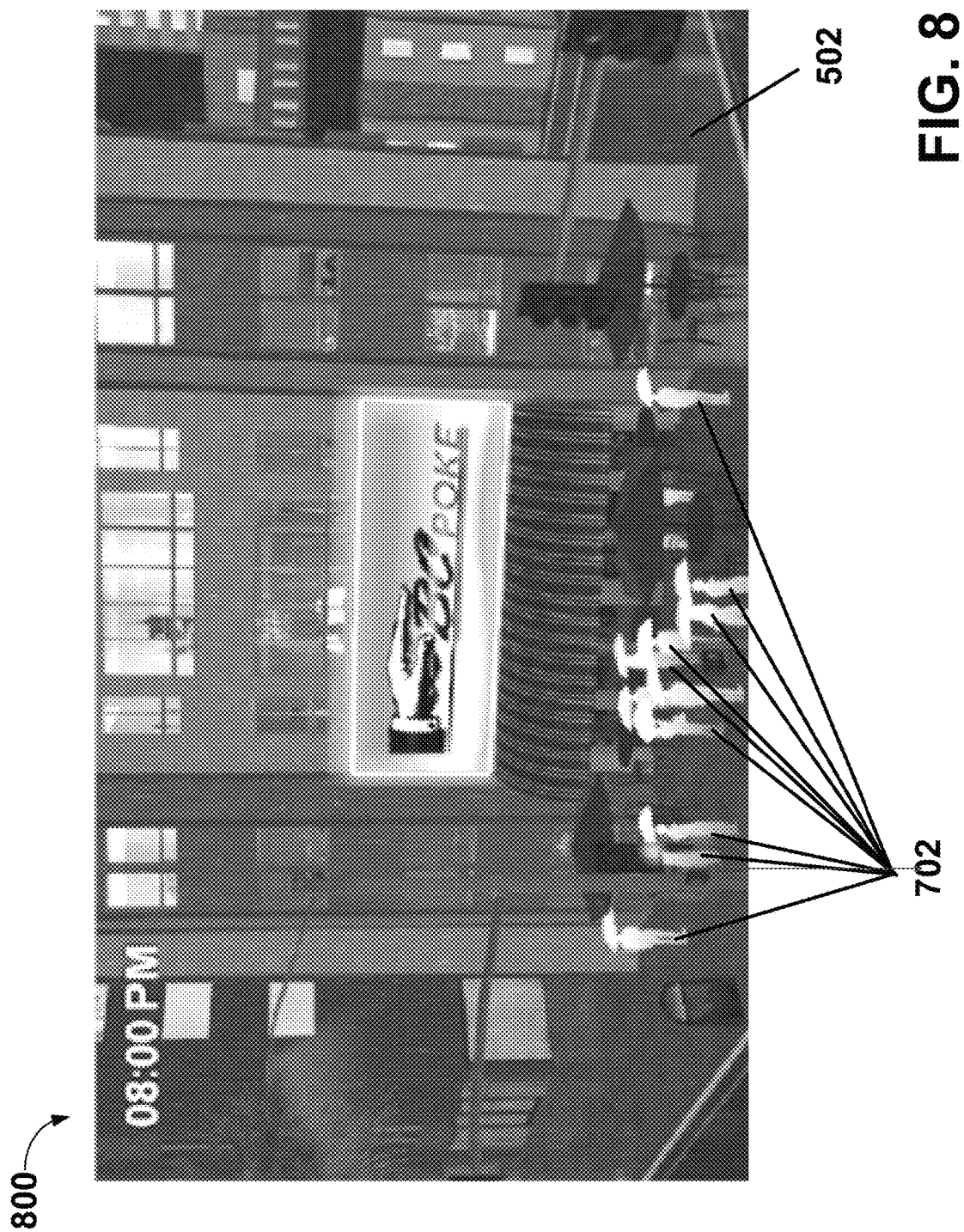
FIG. 8 is a screenshot illustrating a street map view including pedestrian icons displayed with a rainy weather indication according to an example embodiment of the present invention.

FIG. 8 shows another screenshot 800 of a street map view according to an example embodiment of the present invention, in which the pedestrian icons 702 are displayed differently than the manner in which they are displayed in FIG. 7 in order to indicate rainy weather by depicting the pedestrian representations with umbrellas.

Referring again to FIG. 7, the system is configured to generate a building-interior-of-window visualization 705, which is displayed as part of the three dimensional visualization of a point of interest. For example, in an example embodiment, the system is configured to use interior mapping technology, for example, as described in U.S. Provisional Patent Application Ser. No. 62/095,419 filed on Dec.

22, 2014 and in PCT/US2015/067474 filed Dec. 22, 2015, the content of each of which is hereby incorporated by reference in their entireties, to construct the visualization 705 based on images sent by advertisers or proprietors for advertising a particular venue represented in the display as a point of interest. For example, in an example embodiment, the system stores a generic template for visualizations 705 and generates respective visualizations 705 for respective venues by populating the template based on a respective set of images obtained for the respective venue. Display of such imagery informs a user of the types of items that can be obtained or experienced at the respective venue, which can aid a user in traveling to and/or stopping at the location of the venue.

According to an example embodiment, the visualization 705 is user selectable, in response to which the system displays further information regarding the items available at the venue, such as by providing a catalogue and/or displaying a web browser window with a webpage owned and operated by the venue, for example, via which the user can view the available items and/or make an online purchase of such items. As another example, in an example embodiment where the venue is a restaurant, the user can select the window in response to which the system displays an interface via which the user can order dishes and/or make a reservation at the restaurant. In an example embodiment, the system automatically fills in a reservation time field of the reservation making interface with the time at which the user is estimated to reach the destination (although the user is able to modify the time information in the field).

In an example embodiment a respective separate visualization 705 can be provided for each of a plurality of depicted floors of a building. Different ones of the visualizations can correspond to different stores, show different items, and, responsive to respective selections, lead to responsive displays of respective interactive interface displays for interacting with the respective venues to which the respective visualizations 705 correspond.

Figure 9:
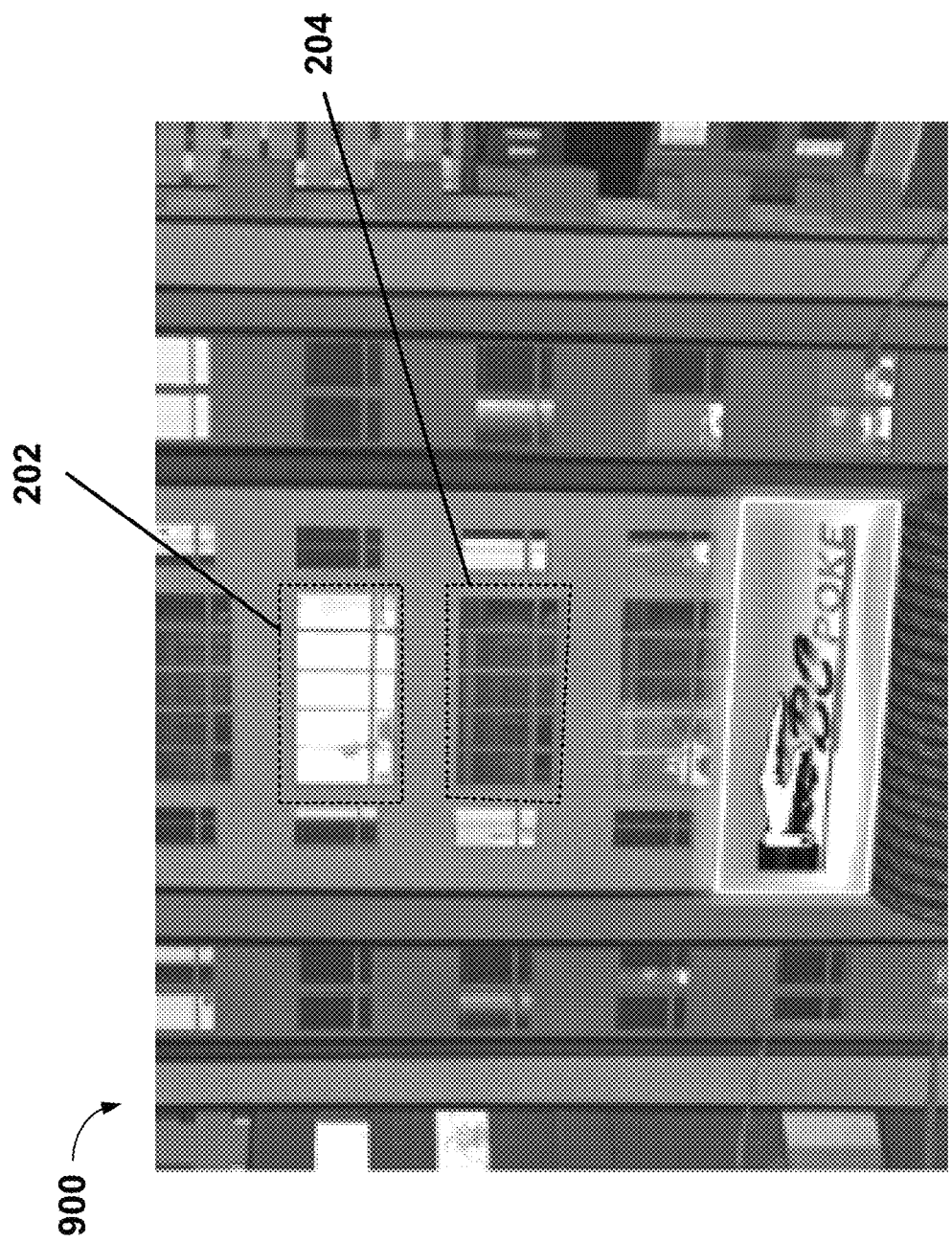
FIG. 9 is a screenshot illustrating a street view including window blocks differentiating between open and closed venues (or venues of user interest from other venues) according to an example embodiment of the present invention.

FIG. 9 is shows another screenshot 900 of a street view including the window blocks 202 and 204 indicating venues that are open and closed, respectively. As noted above, an animation of the window block 202 opening can be displayed to draw the user's attention to the particular venue. When the window block 202 is provided, showing open windows, the window block 202, in an example embodiment, further includes the building-interior-of-window visualization 705 described above.

In an example embodiment, for example in a particular selected navigation mode, the system is configured to automatically change the street view to reflect surroundings of a driven vehicle. Additionally, in an example embodiment, as the user's vehicle travels by a particular venue that is logged in the system as a point of interest, for example, noted as being of particular interest to the particular user at the particular time, the system responsively displays the described animation of the curtains opening in the window block 202 and displays the building-interior-of-window visualization 705, thereby directing the user's attention to the point of interest. In an example embodiment other open venues which are POIs that are not determined to be of particular interest to the user at that point of time are displayed with an open window block 202, but without the animation.

Particularly where a display is generated to represent the vehicle's current surroundings, and where the vehicle is being navigated in a highly autonomous driving mode, where the vehicle automatically performs most of the vehicle control, the pedestrian icons 702 can be provided to indicate to the user why the vehicle may be proceeding slowly or may be swerving. In this regard, in an example embodiment, the system includes a large number of pedestrian icons 702 to reflect a high pedestrian density, which can explain why the vehicle is driving in that manner.

In an example embodiment, the system provides for selection of a navigation mode in which the bubble 106 automatically shifts along the navigation route 102 as the vehicle travels along the travel route to place the bubble 106 at position corresponding to the vehicle's actual position, and accordingly automatically updates the information provided in the informational lens 108. According to this embodiment, in an example, the system also automatically provides the described curtain opening animation in the informational lens 108 as the vehicle passes a significant POI. In an example, the user can input an instruction to switch back to a different mode in which the bubble 106 is not automatically moved.

Figure 10:
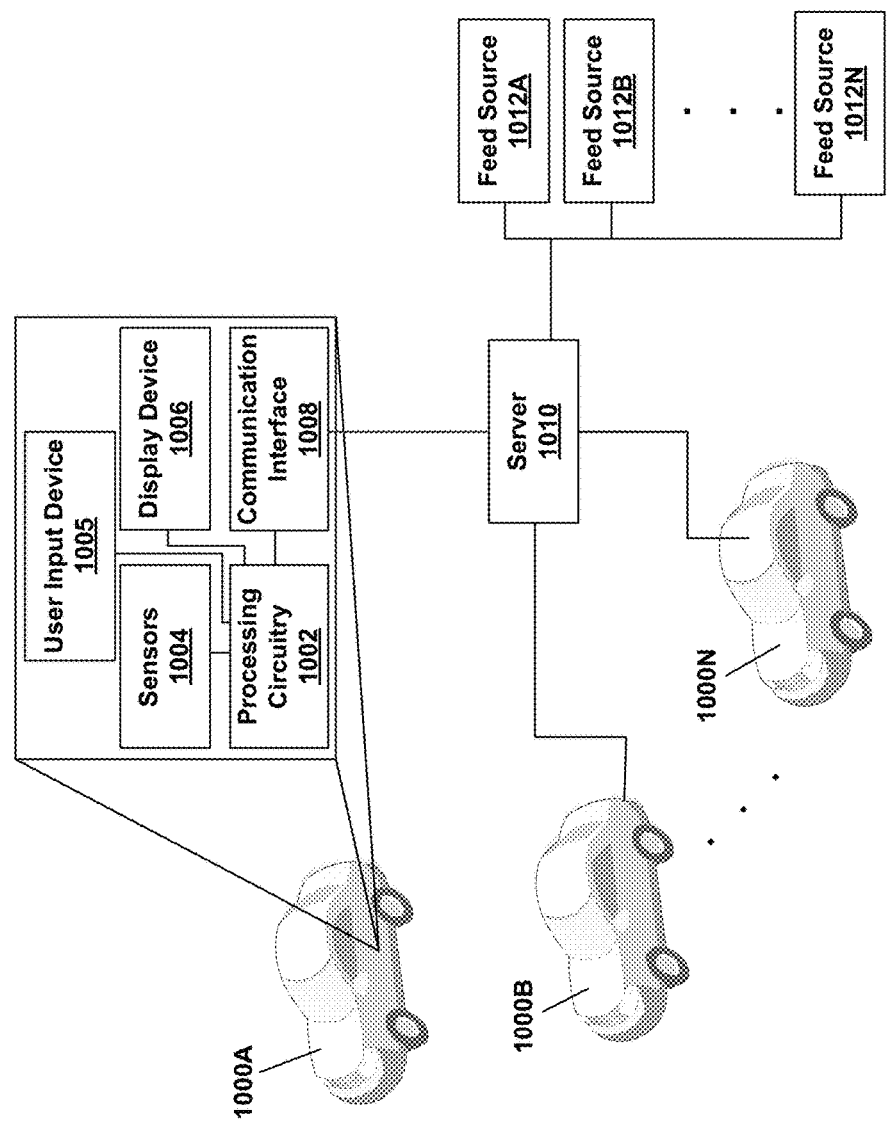
FIG. 10 is a diagram illustrating a system according to an example embodiment of the present invention.

FIG. 10 is a diagram that illustrates a system according to an example embodiment of the present invention, which system is usable for providing the features of the interactive informational display described above. For example, a plurality of vehicles 1000A-1000N are in communication with a server 1010. An example component configuration is shown for one of the vehicles (1000A), but each of the vehicles 1000B-1000N can include the same component configuration of elements thereof. For example, the vehicles includes a communication interface 1008 for, e.g., wirelessly, transmitting information to the server 1010 and/or receiving information from the server 1010.

One or more of the vehicles 1000A-1000N includes sensors 1004 configured to sense an environment surrounding the respective vehicle 1000A-1000N and/or characteristics of the vehicle itself, and produce corresponding signals, which are provided from the sensors 1004 to processing circuitry 1002. The sensors 1004 can include, for example, a camera(s), a radar sensor(s), an acceleration sensor, a Global Positioning System (GPS) sensor and/or receiver or other positioning sensor, etc. The processing circuitry 1002 is configured to process the sensor signals and, based on such processing, transmit information regarding the respective vehicle's environment and/or regarding the respective vehicle itself to the server 1010 via the communication interface 1008. A user input device 1005 can also be used for user input of information, which the processing circuitry 1002 can process, where the information regarding environment and/or vehicle can be further based on such user input. For example, a user can enter input indicating presence of a police car, occurrence of an accident, and/or heavy traffic, etc. Although the input device 1005 is show as a component separate from a display device 1006, in an example embodiment, it can instead be integrated with the display device 1006, such as where the display device 1006 is a touch screen. In an example embodiment, user preferences and/or user social networking information is also provided to the server 1010.

In an example embodiment, the user input device 1005 can also be used to make selections, such as user preferences, current interests, navigation destination, preferred display mode, social networking information, etc.

In an example embodiment, the server 1010 is communicatively coupled to one or more feed sources 1012A-1012N, which provide to the server 1010 information, such as weather conditions and forecasts at various locations and venue information, such as, for example, locations of various venues, hours of operation, website links, etc.

On the basis of the information received from one or more of the vehicles 1000A-1000N and the feed sources 1012A-1012N, the server 1010 is configured to generate respective displays as described above for one or more of the vehicles 1000A-1000N and transmit data representing the respective displays to the respective vehicles 1000A-1000N via their respective communication interfaces 1008 for processing by the respective processing circuitry 1002 to output the displays on the respective display device 1006 of the respective vehicle.

Although the above description refers to the server 1010 generating the displays and transmitting the respective displays to the vehicles, in alternative embodiments, the server 101 aggregates processes the information it receives to generate conclusions regarding current and/or predicted environments and conditions, which the server 101 forwards to one or more of the vehicles 1000A-1000N, with the respective processing circuitry 1002 of the respective vehicles generating the displays based on information received from the server 1010, e.g., according to a hardwired program or by execution of software.

In an example embodiment, the processing circuitry 1002 is configured by a hardwired configuration or by execution of software to process user input signals corresponding to user interaction with the generated displays, to respond to such user interaction by updating the display on the display device 1006. For example, the processing circuitry 1006 is configured to modify the display based on information it had previously received from the server 1010. Alternatively, the processing circuitry 1002 is configured to transmit to the server 1010 a request for new information on the basis of which to generate the update of the display. Alternatively, the processing circuitry 1002 is configured to transmit to the server 1010 a request for an update to the display based on the user interaction, and after receiving data from the server 1010 representing the generated update, output the updated display on the display device 1006.

Figure 11:
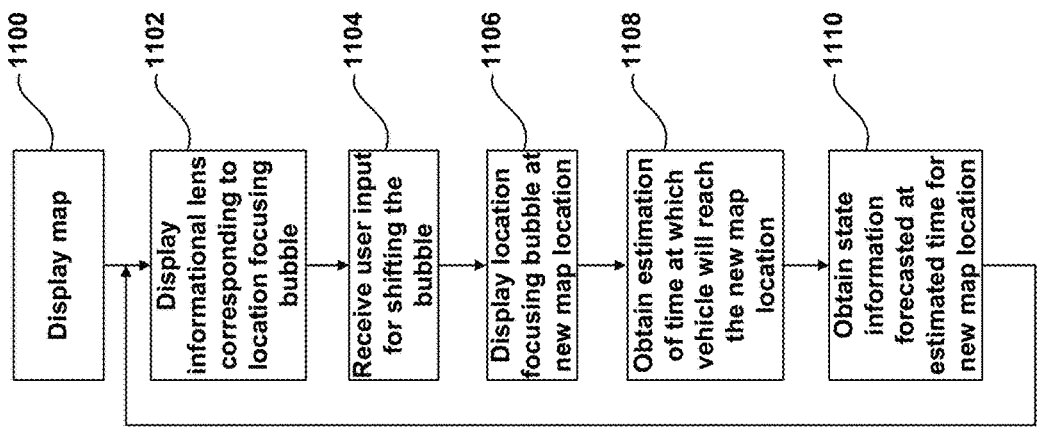
FIG. 11 is a flowchart that illustrates a method according to an example embodiment of the present invention.

FIG. 11 is a flowchart that illustrates an example method according to an example embodiment of the present invention. At step 1100, the processing circuitry displays the electronic map display. At step 1102, the processing circuitry displays an informational lens corresponding to a the location focusing bubble, which bubble overlies a sub-region of the displayed map. At step 1104, the processing circuitry receives user input interpreted as an instruction for shifting the bubble to a new location on the map, which location is at a point along a navigation route. At step 1106, the processing circuitry responsively displays the bubble at the new location. Additionally, at step 1108, the processing circuitry obtains an estimate of a time at which a vehicle is expected to reach the new location by navigating along the navigation route. At step 1110, the processing circuitry obtains information regarding a forecasted state at the new location for the time at which the vehicle is estimated to reach the new location. The processing circuitry then returns to step 1102 to update the display of the informational lens to include details, including information regarding the forecasted state, concerning the new location. While FIG. 11 illustrates a series of steps in a particular sequence, the invention is not limited to the sequence as illustrated in FIG. 11. For example, steps 1108 and 1110 can be performed in response to step 1104 before performance of step 1106.

As described above with respect to FIG. 1, in an example embodiment, the system provides for display of a representation of a current vehicle's navigation route and also a navigation route of social media linked user. Where such a display is provided, and according to an example embodiment in which status information is based on an estimated time at which a location is expected to be reached, if the location is on both the current vehicle's navigation route and that of another linked user, the status information is based on the time at which the current vehicle is expected to reach the location. If the location is only on the other user's navigation route and not on the current vehicle's navigation route, then according to one embodiment, a current state is represented in the informational lens 108. According to an alternative example embodiment, the state information is based on a state estimated for a time at which the other user is estimated to reach the location that is on the other user's navigation route and not on the current vehicle's navigation route. According to another example embodiment, for a location that is on both routes, the system uses the state information forecasted for the later of the times at which the two users are estimated to reach the location, since that is the expected meet-up time for the location should the two users decide to meet at the location. According to an example embodiment, the user can select which user's estimated times to use by a mode selection.

An example embodiment of the present invention is directed to one or more processors, which may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods, alone or in combination, to produce one or more of the displays described herein and respond to user interactions with such displays. The one or more processors may be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape. The one or more processors can alternatively be hardwired with an algorithm for performing the one or more methods.

An example embodiment of the present invention is directed to one or more hardware, non-transitory, computer-readable media, e.g., as described above, having stored thereon instructions executable by a processor to perform the methods described herein.

An example embodiment of the present invention is directed to a method, e.g., of a hardware component or machine, of transmitting instructions executable by a processor to perform the methods described herein.

Example embodiments of the present invention are directed to the execution of one or more of the methods described herein.

The above description is intended to be illustrative, and not restrictive. Those skilled in the art can appreciate from the foregoing description that the present invention can be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A method for providing a location based interactive informational display, the method comprising:
   outputting, by processing circuitry and on a display device, a map of a region represented with a first level of detail and including a location focusing graphical indicia overlaid on a sub-region of the map, wherein:
      generation of the map is partly based on a navigation route calculated for a vehicle;
      the route, within the region of the map, is along roads represented in the map; and
      the map includes a representation of the calculated route;
   outputting, by the processing circuitry and on the display device, a details frame that includes information of the sub-region with a second level of detail that is higher than the first level of detail, wherein the details frame does not overlie the sub-region;
   receiving, by the processing circuitry, user input for modifying the sub-region on which the location focusing graphical indicia is overlaid; and
   responsive to the user input, the processing circuitry modifying the display of the location focusing graphical indicia and modifying the details frame to include information at the second level of detail corresponding to the modified sub-region;
   wherein:
      the information of the sub-region included in the details frame includes a graphical indicia indicating a weather condition at the sub-region;
      the information of the sub-region included in the details frame includes a representation of at least one of a topography and a building structure located in a real-space area to which the sub-region corresponds, so that the information in the details frame for different sub-regions varies with respect to differences in the at least one of the topography and the building structure represented; and
      responsive to information indicating rainy weather at the sub-region, the graphical indicia indicating the weather condition is generated to include a reflection effect on a displayed road surface that is displayed below the at least one of the topography and the building structure, the reflection effect providing a reflection on the road surface of the representation of the at least one of the topography and the building structure.

2. A system for providing a location based interactive informational display, the system comprising:
   a user input and output device that includes a display; and
   processing circuitry;
   wherein:
      the processing circuitry is configured to output on the display device a map of a region represented with a first level of detail and including a location focusing graphical indicia overlaid on a sub-region of the map;
      generation of the map is partly based on a navigation route calculated for a vehicle;
      the route, within the region of the map, is along roads represented in the map;
      the map includes a representation of at least a portion of the calculated route;
      the processing circuitry is configured to:
         output on the display device a details frame that includes information of the sub-region with a second level of detail that is higher than the first level of detail, the details frame not overlying the sub-region;
         responsive to a user interaction with the user input and output device to shift the location focusing graphical indicia to a new position and thereby modify the sub-region on which the location focusing graphical indicia is overlaid, use the calculated route as a track for interpreting the user interaction to thereby identify the new position as being on the track; and
         responsive to the user interaction, modify the display of the location focusing graphical indicia and modify the details frame to include information at the second level of detail corresponding to the modified sub-region;
      at least one of:
         the map is a two-dimensional map of the region and the information included in the details frame includes a three-dimensional representation of structures in the sub-region over which the location focusing graphical indicia is overlaid; and
         at least a part of the information included in the details frame is based on information that (a) is obtained by the processing circuitry via an information feed, (b) is not used for the generation of the map, and (c) includes at least one of a state of weather in the sub-region indicated by the feed, a state of lighting in the sub-region indicated by the feed, a state of pedestrian density indicated by the feed, a business establishment presence in the sub-region indicated by the feed, a presence of a particular system user associated with a system profile within the sub-region indicated by the feed, and a state of traffic in the sub-region indicated by the feed; and
      at least one of:
         (I) (1) the information of the sub-region included in the details frame includes a three-dimensional representation of a building with a graphical indicia identifying presence of a particular venue in the building, (2) the processing circuitry is configured to, based on information identifying the particular venue as at least one of (a) being open at a time to which the map corresponds and (b) being of a category identified as being of interest to a user, when the information of the sub-region, including the identification of the presence of the particular venue, is initially displayed, display an animation at or in association with the graphical indicia identifying the presence of the particular venue, and (3) the animation is of window treatments opening;
         (II) (1) the user input instruction, received at a particular time, is received when the location focusing graphical indicia is located at an edge of the display of the map and is an instruction for shifting the location focusing graphical indicia in a direction past the edge of the map, and (2) the processing circuitry is configured to, responsive to the user input instruction, modify the map to include a representation of a further region that had not previously been represented in the map at the particular time and to remove from the map a representation of a part of the region that had been represented in the map; and (III) (1) the information of the sub-region included in the details frame includes a graphical indicia indicating a weather condition at the sub-region, (2) the information of the sub-region included in the details frame includes a representation of at least one of a topography and a building structure located in a real-space area to which the sub-region corresponds, so that the information in the details frame for different sub-regions varies with respect to differences in the at least one of the topography and the building structure represented, and (3) responsive to information indicating rainy weather at the sub-region, the graphical indicia indicating the weather condition is generated to include a reflection effect on a displayed road surface that is displayed below the at least one of the topography and the building structure, the reflection effect providing a reflection on the road surface of the representation of the at least one of the topography and the building structure.

3. The system of claim 2, wherein (1) the information of the sub-region included in the details frame includes the three-dimensional representation of the building with the graphical indicia identifying the presence of the particular venue in the building, (2) the processing circuitry is configured to, based on the information identifying the particular venue as at least one of (a) being open at the time to which the map corresponds and (b) being of the category identified as being of interest to the user, when the information of the sub-region, including the identification of the presence of the particular venue, is initially displayed, display the animation at or in association with the graphical indicia identifying the presence of the particular venue, and (3) the animation is of window treatments opening.

4. The system of claim 2, wherein (1) the user input instruction, received at the particular time, is received when the location focusing graphical indicia is located at the edge of the display of the map and is the instruction for shifting the location focusing graphical indicia in the direction past the edge of the map, and (2) the processing circuitry is configured to, responsive to the user input instruction, modify the map to include the representation of the further region that had not previously been represented in the map at the particular time and to remove from the map the representation of the part of the region that had been represented in the map.

5. The system of claim 2, wherein (1) the information of the sub-region included in the details frame includes the graphical indicia indicating the weather condition at the sub-region, (2) the information of the sub-region included in the details frame includes the representation of the at least one of the topography and the building structure located in the real-space area to which the sub-region corresponds, so that the information in the details frame for different sub-regions varies with respect to differences in the at least one of the topography and the building structure represented, and (3) responsive to the information indicating rainy weather at the sub-region, the graphical indicia indicating the weather condition is generated to include the reflection effect on the displayed road surface that is displayed below the at least one of the topography and the building structure, the reflection effect providing the reflection on the road surface of the representation of the at least one of the topography and the building structure.

6. A non-transitory computer-readable medium on which are stored instructions that are executable by a processor and that, when executed by the processor, cause the processor to perform a method for providing a location based interactive informational display, the method comprising:

outputting on a display device a map of a region represented with a first level of detail and including a location focusing graphical indicia overlaid on a sub-region of the map, wherein:
generation of the map is partly based on a navigation route calculated for a vehicle;
the route, within the region of the map, is along roads represented in the map; and
the map includes a representation of the calculated route;

outputting on the display device a details frame that includes information of the sub-region with a second level of detail that is higher than the first level of detail, wherein the details frame does not overlie the sub-region;

responsive to a user input instruction for shifting the location focusing graphical indicia to a new position to thereby modify the sub-region on which the location focusing graphical indicia is overlaid:
using the calculated route as a track for interpreting the user input instruction to thereby identify the new position as being on the track; and
modifying the display of the location focusing graphical indicia and modifying the details frame to include information at the second level of detail corresponding to the modified sub-region;

wherein:
at least one of:
the map is a two-dimensional map of the region and the information included in the details frame includes a three-dimensional representation of structures in the sub-region over which the location focusing graphical indicia is overlaid; and
at least a part of the information included in the details frame is based on information that (a) is obtained by the processing circuitry via an information feed, (b) is not used for the generation of the map, and (c) includes at least one of a state of weather in the sub-region indicated by the feed, a state of lighting in the sub-region indicated by the feed, a state of pedestrian density indicated by the feed, a business establishment presence in the sub-region indicated by the feed, a presence of a particular system user associated with a system profile within the sub-region indicated by the feed, and a state of traffic in the sub-region indicated by the feed; and at least one of:
(I) (1) the information of the sub-region included in the details frame includes a three-dimensional representation of a building with a graphical indicia identifying presence of a particular venue in the building, (2) the method further comprises, based on information identifying the particular venue as at least one of (a) being open at a time to which the map corresponds and (b) being of a category identified as being of interest to a user, when the information of the sub-region, including the identification of the presence of the particular venue, is initially displayed, displaying an animation at or in association with the graphical indicia identifying the presence of the particular venue, and (3) the animation is of window treatments opening;
(II) (1) the user input instruction, received at a particular time, is received when the location focusing graphical indicia is located at an edge of the display of the map and is an instruction for shifting the location focusing graphical indicia in a direction past the edge of the map, and (2) the method further comprises, responsive to the user input instruction, modifying the map to include a representation of a further region that had not previously been represented in the map at the particular time and to remove from the map a representation of a part of the region that had been represented in the map; and
(III) (1) the information of the sub-region included in the details frame includes a graphical indicia indicating a weather condition at the sub-region, (2) the information of the sub-region included in the details frame includes a representation of at least one of a topography and a building structure located in a real-space area to which the sub-region corresponds, so that the information in the details frame for different sub-regions varies with respect to differences in the at least one of the topography and the building structure represented, and (3) responsive to information indicating rainy weather at the sub-region, the graphical indicia indicating the weather condition is generated to include a reflection effect on a displayed road surface that is displayed below the at least one of the topography and the building structure, the reflection effect providing a reflection on the road surface of the representation of the at least one of the topography and the building structure.

7. The non-transitory computer-readable medium of claim 6, wherein (1) the information of the sub-region included in the details frame includes the three-dimensional representation of the building with the graphical indicia identifying the presence of the particular venue in the building, (2) the method further comprises, based on the information identifying the particular venue as at least one of (a) being open at the time to which the map corresponds and (b) being of the category identified as being of interest to the user, when the information of the sub-region, including the identification of the presence of the particular venue, is initially displayed, displaying an animation at or in association with the graphical indicia identifying the presence of the particular venue, and (3) the animation is of the window treatments opening.

8. The non-transitory computer-readable medium of claim 6, wherein (1) the user input instruction, received at the particular time, is received when the location focusing graphical indicia is located at the edge of the display of the map and is the instruction for shifting the location focusing graphical indicia in the direction past the edge of the map, and (2) the method further comprises, responsive to the user input instruction, modifying the map to include the representation of the further region that had not previously been represented in the map at the particular time and to remove from the map the representation of the part of the region that had been represented in the map.

9. The non-transitory computer-readable medium of claim 6, wherein the information of the sub-region included in the details frame includes the graphical indicia indicating the weather condition at the sub-region, (2) the information of the sub-region included in the details frame includes the representation of the at least one of the topography and the building structure located in the real-space area to which the sub-region corresponds, so that the information in the details frame for the different sub-regions varies with respect to the differences in the at least one of the topography and the building structure represented, and (3) responsive to information indicating rainy weather at the sub-region, the graphical indicia indicating the weather condition is generated to include the reflection effect on the displayed road surface that is displayed below the at least one of the topography and the building structure, the reflection effect providing the reflection on the road surface of the representation of the at least one of the topography and the building structure.

10. A method for providing a location based interactive informational display, the method comprising:
outputting, by processing circuitry and on a display device, a map of a region represented with a first level of detail and including a location focusing graphical indicia overlaid on a sub-region of the map, wherein:
generation of the map is partly based on a navigation route calculated for a vehicle;
the route, within the region of the map, is along roads represented in the map; and
the map includes a representation of the calculated route;
outputting, by the processing circuitry and on the display device, a details frame that includes information of the sub-region with a second level of detail that is higher than the first level of detail, wherein the details frame does not overlie the sub-region;
responsive to a user input instruction for shifting the location focusing graphical indicia to a new position to thereby modify the sub-region on which the location focusing graphical indicia is overlaid:
using, by the processing circuitry, the calculated route as a track for interpreting the user input instruction to thereby identify the new position as being on the track; and
the processing circuitry modifying the display of the location focusing graphical indicia and modifying the details frame to include information at the second level of detail corresponding to the modified sub-region;
wherein:
at least one of:
the map is a two-dimensional map of the region and the information included in the details frame includes a three-dimensional representation of structures in the sub-region over which the location focusing graphical indicia is overlaid; and
at least a part of the information included in the details frame is based on information that (a) is obtained by the processing circuitry via an information feed, (b) is not used for the generation of the map, and (c) includes at least one of a state of weather in the sub-region indicated by the feed, a state of lighting in the sub-region indicated by the feed, a state of pedestrian density indicated by the feed, a business establishment presence in the sub-region indicated by the feed, a presence of a particular system user associated with a system profile within the sub-region indicated by the feed, and a state of traffic in the sub-region indicated by the feed; and at least one of:
(I) (1) the information of the sub-region included in the details frame includes a three-dimensional representation of a building with a graphical indicia identifying presence of a particular venue in the building, (2) the method further comprises, based on information identifying the particular venue as at least one of (a) being open at a time to which the map corresponds and (b) being of a category identified as being of interest to a user, when the information of the sub-region, including the identification of the presence of the particular venue, is initially displayed, displaying an animation at or in association with the graphical indicia identifying the presence of the particular venue, and (3) the animation is of window treatments opening; and
(II) (1) the user input instruction, received at a particular time, is received when the location focusing graphical indicia is located at an edge of the display of the map and is an instruction for shifting the location focusing graphical indicia in a direction past the edge of the map, and (2) the method further comprises, responsive to the user input instruction, the processing circuitry modifying the map to include a representation of a further region that had not previously been represented in the map at the particular time and to remove from the map a representation of a part of the region that had been represented in the map.

11. The method of claim 10, wherein the map is the two dimensional map and the information included in the details frame includes the three dimensional representation of structures in the sub-region over which the location focusing graphical indicia is overlaid.

12. The method of claim 11, wherein the details frame is in the form of a magnifying lens overlaid on the map within outer boundaries of the map.

13. The method of claim 10, wherein the location focusing graphical indicia is in the form of a transparent lens.

14. The method of claim 10, wherein the modifying of the display of the location focusing graphical indicia includes changing a size of the location focusing graphical indicia to enlarge or reduce a size of the sub-region.

15. The method of claim 10, wherein the modifying of the display of the location focusing graphical indicia includes shifting the location focusing graphical indicia to a different sub-region of the map.

16. The method of claim 15, further comprising:
obtaining, by the processing circuitry, the navigation route for the vehicle, wherein the navigation route is to a selected destination and wherein the different sub-region is along the navigation route;
determining, by the processing circuitry, a time when the vehicle is estimated to reach the different sub-region; and
based on the determined time, obtaining, by the processing circuitry, information regarding at least one state forecasted to be existent at the sub-region at the estimated time, wherein the information of the sub-region included in the details frame includes a graphical indicia identifying the state forecasted to be existent at the sub-region at the estimated time.

17. The method of claim 10, wherein the information of the sub-region included in the details frame includes a graphical indicia indicating a weather condition at the sub-region.

18. The method of claim 10, wherein the information of the sub-region included in the details frame includes at least one graphical indicia indicating a traffic condition at the sub-region.

19. The method of claim 18, wherein each of the at least one graphical indicia is a three dimensional graphical representation of a vehicle.

20. The method of claim 19, wherein the three dimensional graphical representation of the vehicle is color coded according to traffic flow at a road segment on which the respective three dimensional graphical representation of the vehicle is displayed.

21. The method of claim 19, wherein the three dimensional graphical representation of the vehicle is animated to move along a road segment.

22. The method of claim 10, wherein the information of the sub-region included in the details frame includes at least one graphical indicia indicating a pedestrian presence state at the sub-region.

23. The method of claim 10, wherein:
the information of the sub-region included in the details frame includes the three-dimensional representation of a building with the graphical indicia identifying the presence of the particular venue in the building;
the method further comprises, based on the information identifying the particular venue as at least one of (a) being open at the time to which the map corresponds and (b) being of the category identified as being of interest to the user, when the information of the sub-region, including the identification of the presence of the particular venue, is initially displayed, displaying the animation at or in association with the graphical indicia identifying the presence of the particular venue; and
the animation is of the window treatments opening.

24. The method of claim 23, wherein the displaying the animation is based on the information identifying the particular venue as being open at the time to which the map corresponds.

25. The method of claim 23, wherein the displaying the animation is based on the information identifying the particular venue as being of the category identified as being of interest to the user.

26. The method of claim 23, wherein the graphical indicia includes a representation of a window with a representation, in the window, of items sold at the particular venue.

27. The method of claim 23, wherein the graphical indicia includes a user selectable element, and the method includes, in response to selection of the user selectable element, displaying an electronic form for requesting a reservation.

28. The method of claim 27, further comprising:
obtaining, by the processing circuitry, the navigation route for the vehicle, wherein the navigation route is to a selected destination;
determining, by the processing circuitry, a time when the vehicle is estimated to reach the sub-region; and
based on the determined time, automatically entering, by the processing circuitry and in a reservation time field of the electronic form, a reservation time.

29. The method of claim 23, wherein the information of the sub-region included in the details frame includes an indication of whether the particular venue is in an open state or a closed state.

30. The method of claim 29, wherein the indication of whether the particular venue is in the open state or the closed state is a graphical representation of one or more windows, the processing circuitry being configured to display the one or more windows as darkened windows to indicate the closed state and with light windows to indicate the open state.

31. The method of claim 10, wherein the modifying of the display of the location focusing graphical indicia includes enlarging the location focusing graphical indicia so that the sub-region of the map over which the location focusing graphical indicia overlies is enlarged, and the modifying of the details frame includes responsively reducing a granularity of the information in the details frame in order to provide information of the enlarged sub-region.

32. The method of claim 10, wherein the modifying of the display of the location focusing graphical indicia includes reducing a size of the location focusing graphical indicia so that the sub-region of the map over which the location focusing graphical indicia overlies is reduced, and the modifying of the details frame includes responsively enlarging a granularity of the information in the details frame while limiting the information in the details frame to the reduced sub-region.

33. The method of claim 10, wherein at least the part of the information included in the details frame is based on the information that (a) is obtained by the processing circuitry via an information feed, (b) is not used for the generation of the map, and (c) includes at least one of the state of weather in the sub-region indicated by the feed, the state of lighting in the sub-region indicated by the feed, the state of pedestrian density indicated by the feed, the business establishment presence in the sub-region indicated by the feed, the presence of the particular system user associated with a system profile within the sub-region indicated by the feed, and the state of traffic in the sub-region indicated by the feed.

34. The method of claim 10, wherein the user input instruction, received at the particular time, is received when the location focusing graphical indicia is located at the edge of the display of the map and is the instruction for shifting the location focusing graphical indicia in the direction past the edge of the map, the method further comprising, responsive to the user input instruction, the processing circuitry modifying the map to include the representation of the further region that had not previously been represented in the map at the particular time and to remove from the map the representation of the part of the region that had been represented in the map.

35. The method of claim 10, further comprising, responsive to user input dragging a graphical representation within the details frame, without shifting the details frame, the processing circuitry shifting the location focusing graphical indicia to overlay a different sub-region of the map.

36. A method for providing a location based interactive informational display, the method comprising:
    outputting, by processing circuitry and on a display device, a user-interactive map of a region that is at a first geographic location, wherein the map includes a three-dimensional representation of buildings in the region to which the map corresponds; and
    responsive to user input, the processing circuitry shifting the region to which the map corresponds to a second geographic location and modifying the three-dimensional representation to reflect the shifted region;
    wherein:
        the modifying includes bringing into view in the map a representation of a building not displayed when the region was at the first geographic location and, when bringing the building into view, displaying an animation of a window treatment of the representation of the building opening; and
        the displaying of the animation is based on the processing circuitry determining satisfaction of a condition that the represented building corresponds to a venue that is identified by the processing circuitry as at least one of (a) being open at a time to which the map display corresponds and (b) being of a category of interest to a user for which the map display is output.

\* \* \* \* \*